United States Patent
Wei et al.

(10) Patent No.: US 9,236,828 B1
(45) Date of Patent: Jan. 12, 2016

(54) METHODS AND POWER CONVERSION SYSTEM CONTROL APPARATUS TO CONTROL IGBT JUNCTION TEMPERATURE AT LOW SPEED

(71) Applicants: Lixiang Wei, Mequon, WI (US); Jiangang Hu, Grafton, WI (US); Jeffrey D. McGuire, Franklin, WI (US)

(72) Inventors: Lixiang Wei, Mequon, WI (US); Jiangang Hu, Grafton, WI (US); Jeffrey D. McGuire, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 21 days.

(21) Appl. No.: 14/323,070

(22) Filed: Jul. 3, 2014

(51) Int. Cl.
*H02P 27/04* (2006.01)
*H02P 27/08* (2006.01)
*H02M 7/537* (2006.01)
*H02P 23/00* (2006.01)
*H02J 3/00* (2006.01)
*H02M 5/45* (2006.01)
*H02M 1/12* (2006.01)
*H02P 27/06* (2006.01)

(52) U.S. Cl.
CPC .............. *H02P 27/08* (2013.01); *H02M 7/537* (2013.01); *H02P 27/06* (2013.01)

(58) Field of Classification Search
CPC ................... H02M 2007/53876; H02M 5/458; H02M 5/4585; H02M 7/53873; H02M 1/44; H02M 7/219; H02M 7/529; H02M 7/5395; H02P 21/06; H02P 25/04; H02P 21/14; H02P 27/08; H03K 17/163; H03K 17/168
USPC ............ 318/799–803; 363/34–35, 37, 39–41, 363/131–132
See application file for complete search history.

(56) References Cited

U.S. PATENT DOCUMENTS

| | | | |
|---|---|---|---|
| 4,926,104 A * | 5/1990 | King | H02M 7/53875 318/599 |
| 5,623,219 A | 4/1997 | Karraker | |
| 5,847,536 A * | 12/1998 | Miyazaki | H02P 25/04 318/801 |
| 5,847,943 A * | 12/1998 | Vogel | H02P 21/0035 363/34 |
| 5,936,856 A | 8/1999 | Xiang | |
| 6,023,417 A | 2/2000 | Hava et al. | |
| 6,185,115 B1 | 2/2001 | Sul et al. | |

(Continued)

OTHER PUBLICATIONS

Hava, et al., "A High Performance Generalized Discontinuous PWM Algorithm", IEEE Applied Power Electronics Conference, Feb. 1997, vol. 2, pp. 886-891, IEEE Trans. on Industry Applications Version.

(Continued)

*Primary Examiner* — Adolf Berhane
*Assistant Examiner* — Henry Lee, III
(74) *Attorney, Agent, or Firm* — Fay Sharpe LLP

(57) ABSTRACT

Methods, apparatus and computer readable mediums are presented for controlling a multiphase inverter in which third harmonic injection pulse width modulation (THIPWM) is used for generating inverter switching control signals at or above a non-zero threshold inverter output frequency, and high frequency injection discontinuous pulse width modulation (HFIDPWM) is used for inverter output frequencies below the threshold, where the threshold frequency corresponds to a threshold period less than or equal to the thermal impedance time constant of the inverter switching devices, and the injected high frequency component for HFIDPWM corresponds to a common mode period less than the thermal impedance time constant to mitigate thermal stress on the inverter switches and low speed inverter output derating.

20 Claims, 3 Drawing Sheets

(56) References Cited

U.S. PATENT DOCUMENTS

| | | | |
|---|---|---|---|
| 6,233,396 B1 | 5/2001 | Kuwada et al. | |
| 6,617,819 B2 | 9/2003 | Dohmae et al. | |
| 6,710,564 B2 | 3/2004 | Shibuya et al. | |
| 7,034,501 B1 | 4/2006 | Thunes et al. | |
| 7,102,327 B2 | 9/2006 | Ho | |
| 7,141,943 B2 | 11/2006 | Song et al. | |
| 7,176,652 B2* | 2/2007 | Wakabayashi | H02P 29/0038 318/400.02 |
| 7,187,155 B2 | 3/2007 | Matsuo et al. | |
| 7,190,599 B2 | 3/2007 | Virolainen et al. | |
| 7,265,954 B2 | 9/2007 | Hikawa et al. | |
| 7,400,518 B2 | 7/2008 | Yin et al. | |
| 7,495,938 B2 | 2/2009 | Wu et al. | |
| 7,629,764 B2 | 12/2009 | Shoemaker et al. | |
| 7,649,756 B2 | 1/2010 | Kerkman et al. | |
| 7,679,310 B2 | 3/2010 | Schulz et al. | |
| 7,738,267 B1 | 6/2010 | Tallam et al. | |
| 7,759,897 B2 | 7/2010 | Piippo | |
| 7,825,621 B2 | 11/2010 | Wei et al. | |
| 7,834,574 B2* | 11/2010 | West | G01R 19/2509 318/494 |
| 7,881,081 B1 | 2/2011 | Tallam et al. | |
| 8,054,032 B2 | 11/2011 | Chakrabarti et al. | |
| 8,107,267 B2 | 1/2012 | Tallam et al. | |
| 2004/0195995 A1 | 10/2004 | Quirion et al. | |
| 2006/0067092 A1 | 3/2006 | Nondahl et al. | |
| 2007/0268728 A1 | 11/2007 | Mohan et al. | |
| 2009/0109713 A1* | 4/2009 | Schnetzka | H02M 7/003 363/34 |
| 2010/0165674 A1 | 7/2010 | Dai et al. | |
| 2010/0172161 A1 | 7/2010 | Tallam et al. | |
| 2011/0141774 A1* | 6/2011 | Kane | H02M 1/126 363/37 |
| 2011/0299308 A1 | 12/2011 | Cheng et al. | |
| 2012/0075892 A1 | 3/2012 | Tallam et al. | |
| 2012/0112674 A1 | 5/2012 | Schulz et al. | |
| 2012/0140532 A1 | 6/2012 | Tallam et al. | |
| 2012/0201056 A1 | 8/2012 | Wei et al. | |

OTHER PUBLICATIONS

Sutar et al., "Performance Analysis of Z-Source Inverter Fed Induction Motor Drive", Int'l Journal of Scientific & Engineering Research, vol. 3, Issue 5, May 2012, pp. 1-6.

Yoo et al., "Third Harmonic Injection Circuit to Eliminate Electrolytic Capacitors in Light-Emitting Diode Drivers", Journal of Electrical Engineering & Technology, vol. 7, No. 3, pp. 358-365, 2012.

Younis et al., "High Efficiency THIPWM Three-Phase Inverter for Grid Connected System", 2010 IEEE Symposium on Industrial Electronics and Applications (ISIEA 2010), Oct. 3-5, 2010, Penang, Malaysia, pp. 88-93.

Younis et al., "Simulation of Grid Connected THIPWM-Three-Phase Inverter Using SIMULINK", 2011 IEEE Symposium on Industrial Electronics and Applications (ISIEA2011), Sep. 25-28, 2011, Langkawi, Malaysia, pp. 133-137.

* cited by examiner

METHODS AND POWER CONVERSION SYSTEM CONTROL APPARATUS TO CONTROL IGBT JUNCTION TEMPERATURE AT LOW SPEED

BACKGROUND INFORMATION

The subject matter disclosed herein relates to power conversion, and more specifically to apparatus and techniques for operating a multiphase inverter.

BRIEF DESCRIPTION

One or more aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

Control apparatus, methods and computer readable mediums are disclosed in certain embodiments for controlling a multiphase inverter when the inverter output fundamental frequency is less than a non-zero threshold through computing high frequency injected phase duty ratios at least partially according to at least one desired output parameter and a common mode frequency corresponding to a common mode period less than a time constant of a thermal impedance of switching devices of the multiphase inverter. For such low speed operation, the method further includes computing offset phase duty ratios at least partially according to an offset value and the high frequency injected phase duty ratios, and generating inverter switching control signals using discontinuous pulse width modulation (DPWM) at least partially according to the offset phase duty ratios.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
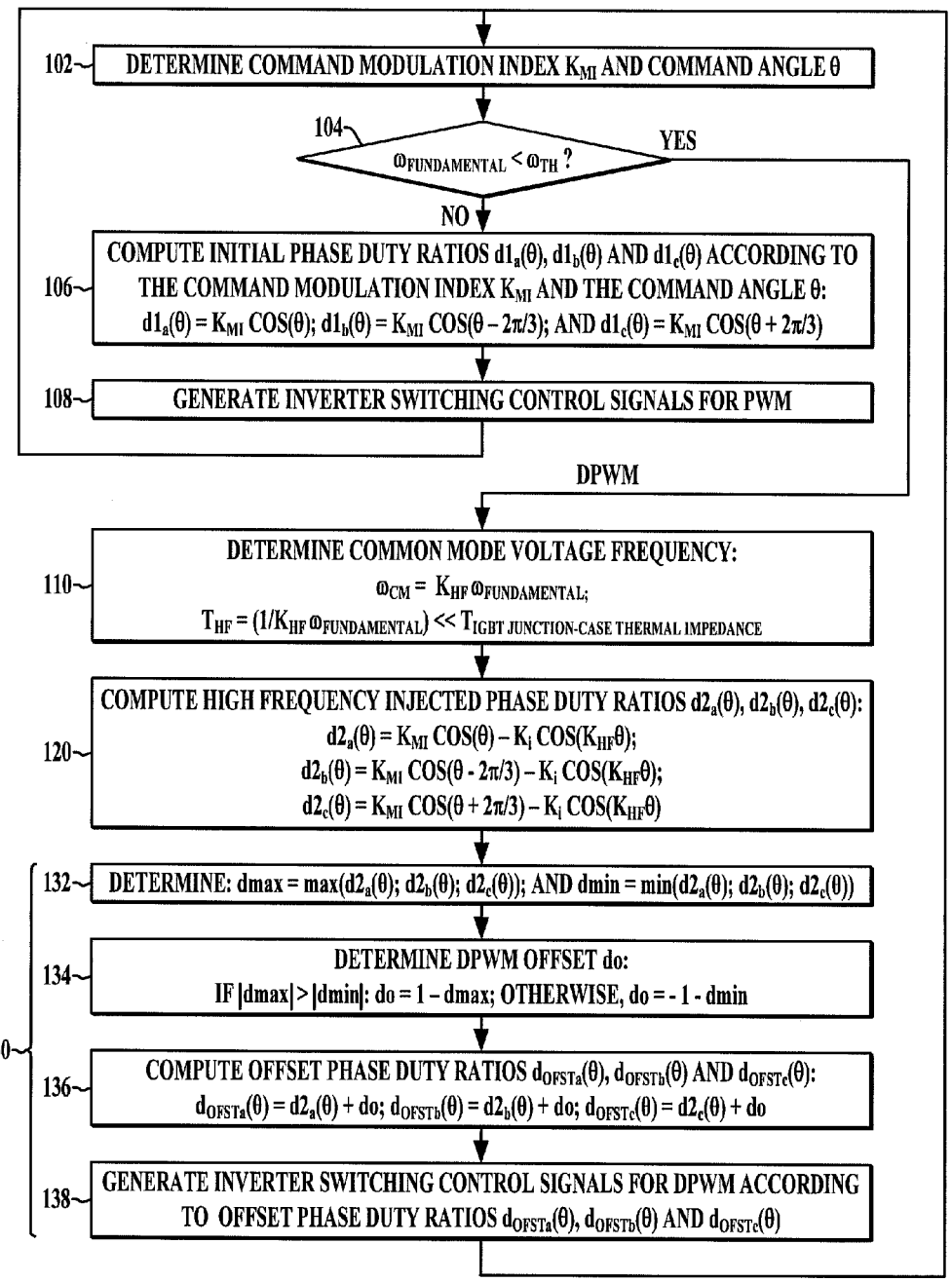
FIG. 1 is a flow diagram.
Figure 4:
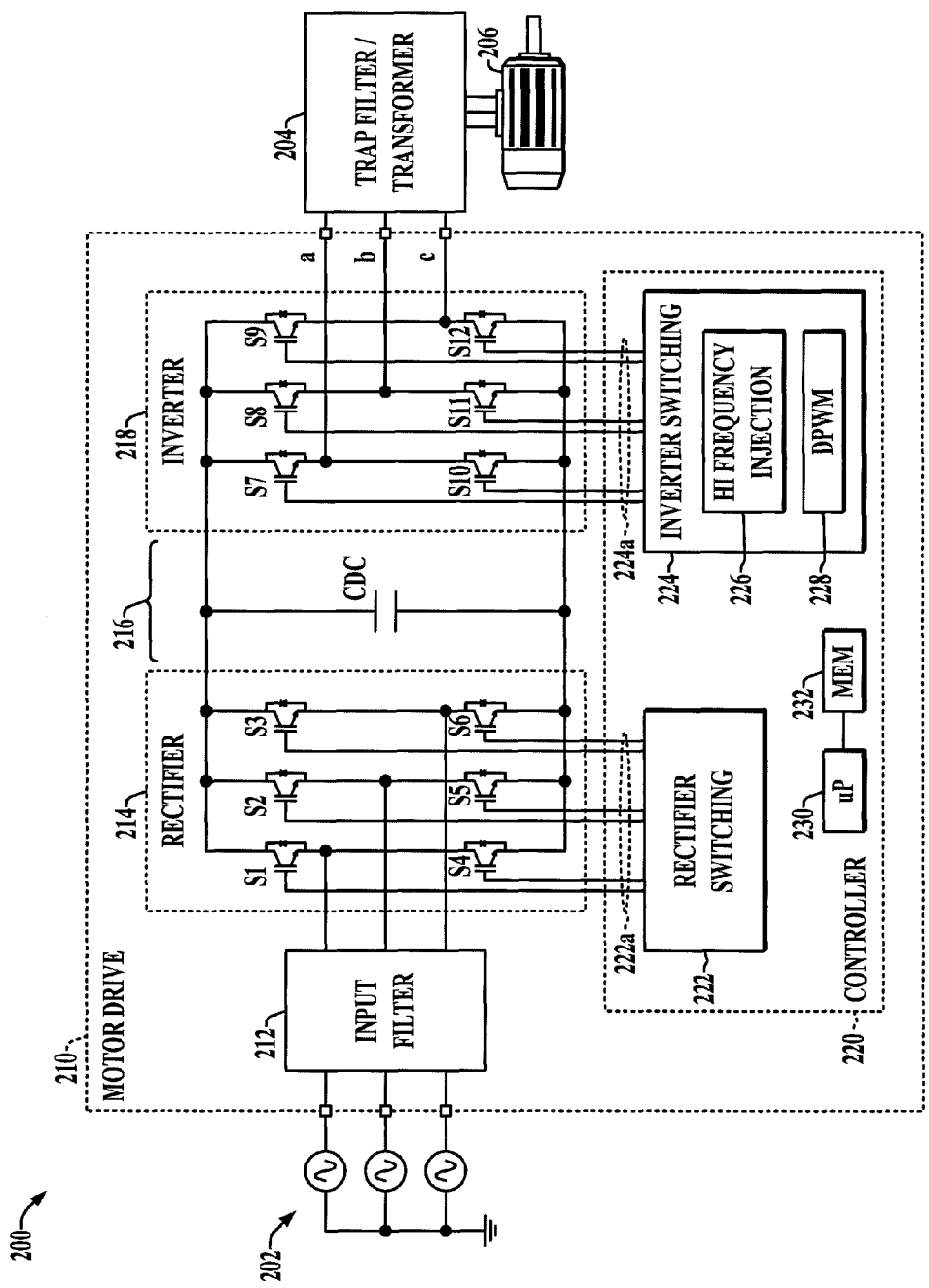
FIG. 4 is a system diagram.

Referring initially to FIGS. 1 and 4, one or more embodiments or implementations are hereinafter described in conjunction with the drawings, wherein like reference numerals are used to refer to like elements throughout, and wherein the various features are not necessarily drawn to scale. A process 100 is illustrated in FIG. 1 for controlling a multiphase inverter, such as an inverter 218 in a power conversion system 210 shown in FIG. 4. The various concepts of the present disclosure are illustrated and described in the context of a motor drive type power conversion system 210, although the present disclosure is not limited to motor drives and can be implemented in various forms of power conversion systems having a multiphase inverter, including without limitation motor drives, grid-tie converters, wind energy systems, etc. Moreover, although illustrated embodiments provide two-level multiphase inverters, the concepts of the present disclosure are applicable to any multilevel converters having two or more levels. The system 200 in FIG. 4 converts power from an external source 202 via a motor drive power conversion system 210 in order to provide output power to a load, in this case a motor 206. The power conversion system 210 of FIG. 4 receives multiphase AC input power from the illustrated external source 202, although other embodiments are possible in which single phase input power is provided to the system 210. In addition, the illustrated system 210 receives a three phase input, but other multiphase embodiments are possible. Moreover, different embodiments may receive DC input power, for example, without requiring an internal rectifier 214.

The motor drive system 210 of FIG. 4 includes an input filter circuit 212, in one embodiment a three phase LCL filter having grid side inductors as well as series connected converter side inductors in each line, with filter capacitors (not shown) connected between the corresponding grid and converter side inductors and a common connection node or neutral, which may but need not be connected to a system ground. Other alternate input filter circuit configurations can be used, including without limitation LC filters.

The motor drive system 210 also includes a rectifier 214, a DC bus or DC link circuit 216 and a multiphase output inverter 218. The rectifier 214 and the inverter 218 include switches S1-S6 and S7-S12, respectively, which can be IGBTs, FETs, or other suitable form of electrical switches operated by a controller 220 using suitable switching control signals. The controller 220 includes a rectifier controller 222 for selectively providing rectifier switching control signals 222a to operate the switches S1-S6 to rectify the three phase input power to provide a DC bus voltage across a DC link capacitor CDC in the DC link circuit 216. The system 210 in this example is a voltage source converter (VSC). Other embodiments are possible in which the link circuit 216 includes one or more link chokes or inductors with the rectifier converter 214 operating to provide a controlled DC link current for a current source converter (CSC) drive system 210. Moreover, while the illustrated system 210 includes an active rectifier or active front end (AFE) 214, a passive rectifier circuit can alternatively be used or the drive 210 may directly receive a DC input for use by the inverter 218, and the illustrated input filter 212 may be omitted in certain implementations.

As further shown in FIG. 4, an output transformer and trap filter circuit 204 can be provided, which may be external to the drive system 210 or may be integral thereto in various embodiments. For example, an output transformer may be used to boost the output voltage provided by the drive system 218 for driving a high voltage motor load 206, with the trap filter being a multiphase LCL or LC configuration to reduce the output transformer voltage ripple and therefore protect the motor load 206. The trap filter and transformer circuitry, moreover, are typically designed around a specific frequency associated with switching operation of the inverter 218.

The inverter 218 includes switches S7-S12 operated by switching control signals 224a from an inverter switching component 224 of the drive controller 220 for providing a multiphase output to drive the load 206 according to one or more desired output operating parameters, such as output speed or frequency, torque, etc. The inverter controller 224 in one embodiment computes a command modulation index $K_{MI}$ and an angle θ used in generating pulse width modulation (PWM) switching control signals 224a to achieve the desired motor speed, torque, etc. in each of a series of inverter switching cycles. The drive controller 220 and the components thereof may be implemented as any suitable hardware, processor-executed software, processor-executed firmware, logic, and/or combinations thereof wherein the illustrated controller 220 can be implemented largely in processor-executed software or firmware providing various control functions by which the controller 220 receives feedback and/or input signals and/or values (e.g., setpoint(s)) and provides rectifier and inverter switching control signals 222a and 224a to operate the rectifier switching devices S1-S6 and switches S7-S12 of the inverter 218 to convert input power for providing AC output power to drive the load 206. In addition, the controller 220 and the components thereof can be implemented in a single processor-based device, such as a microprocessor, microcontroller, FPGA, etc., or one or more of these can be separately implemented in unitary or distributed fashion by two or more processor devices.

The rectifier and inverter switches S1-S12 may be insulated gate bipolar transistors (IGBTs) or other suitable form of semiconductor-based switching devices operable according to a corresponding switching control signals 222a, 224a to selectively conduct current when actuated. In this regard, the rectifier and inverter switching control components 222 and 224 of the drive controller 220 may include suitable analog driver circuitry to generate signal suitable for operating the switching devices S1-S12. In addition, diodes are connected across the individual IGBTs S1-S12 as shown in FIG. 4.

Operation of the rectifier switches S1-S6 is controlled according to pulse width modulated rectifier switching control signals 222a to provide active rectification of the AC input power from the source 202 to provide a DC voltage across the capacitance CDC (or to provide DC current through a link choke for a current source converter (CSC) implementation). The inverter switches S7-S12 are coupled to receive power from the DC bus 216 and to provide AC output power to the motor or other load 206, where the switches S7-S12 operate according to PWM switching control signals 224a from the inverter controller 224. The inverter controller 224 in certain embodiments may also provide a DC command signal or value to the rectifier switching controller 222 to cause the rectifier controller 222 to operate the rectifier switches S1-S6 to provide a regulated DC output accordingly. In addition, the controller 220 receives various input signals or values, including setpoint signals or values for desired output operation, such as motor speed, position, torque, etc., as well as feedback signals or values (not shown) representing operational values of various portions of the motor drive system 210.

The inventors have appreciated that the inverter switches S7-S12 have a thermal impedance time constant, such as an IGBT junction-to-case thermal impedance time constant $T_{IGBT\ JUNCTION-CASE\ THERMAL\ IMPEDANCE}$ which is generally commensurate with the fundamental inverter output frequency at certain low speeds. For example, certain IGBTs used in motor drive applications have a junction-case thermal impedance time constant of around 10-100 ms. Moreover, although the average IGBT losses for space vector modulation operation generally decrease with decreasing inverter output fundamental frequency, IGBT switching losses begin to predominate over average losses as the switching period (the reciprocal of the fundamental frequency) increases. As a result, absent the apparatus and techniques of the present disclosure, the torque rating of the drive system 210 would need to be derated at low speeds and/or the IGBT switches S7-S12 would need to be oversized due to the junction temperature limit of the IGBTs.

One approach to solving this problem would be to simply reduce the inverter switching frequency for low-speed operation, for example, from a normal 2 kHz level down to 1 kHz in order to increase or maintain the torque rating without violating the IGBT junction temperature limitations. As mentioned above, however, the output trap filter circuitry 204 is tuned to a specific output frequency, and thus modifying the inverter switching frequency is not a practical solution for all applications. Another approach to reducing IGBT loss is the use of DPWM techniques. While DPWM may generally reduce average losses compared with pulse width modulation (SVPWM), DPWM suffers from higher conduction losses at lower speeds (lower inverter fundamental output frequency $\omega_{FUNDAMENTAL}$). Consequently, the IGBT junction temperature may be higher using DPWM at low speeds, and the low-speed operating parameters may need to be derated to avoid thermal overload of the switches S7-S12.

In order to minimize thermal stress to the switches S7-S12 at low speed and/or high torque startup situations without requiring drive derating or oversizing of the switches, the present disclosure provides multiphase inverter control techniques implemented in certain embodiments using the drive controller processor 230 operating according to computer executable instructions stored in the electronic memory 232. As seen in FIG. 4, the inverter switching control component 224 provides a high frequency injection component 226 as well as a DPWM component 228, which can be implemented in certain embodiments as processor-executed instructions stored in the memory 232. In particular embodiments, the processor 230 provides selective high-frequency injection with discontinuous pulse width modulation at low frequencies in order to avoid or mitigate thermal stress to the switching devices S7-S12, thereby facilitating for rated operation of the motor drive system 210 for high torque startup and/or low-speed operation, and without requiring oversizing of the switches S7-S12, and without requiring adjustment to the inverter pulse width modulation switching frequency. This, in turn, improves the performance of the power conversion system 210 without any restrictions as to the usage of an output transformer and/or trap filter circuit 204 for motor drive in other power conversion applications.

FIG. 1 shows an exemplary method or process 100 for controlling operation of a multiphase inverter, such as the inverter 218 in the motor drive power conversion system 210 of FIG. 4, showing one switching cycle of the inverter 218. While the method 100 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 and other methods of the disclosure may be implemented in hardware, processor-executed software, or combinations thereof, such as in the exemplary motor drive controller 230 described above in one embodiment, and may be embodied in the form of computer executable instructions stored in a tangible, non-transitory computer readable medium, such as in a memory 232 in one example.

At 102 in FIG. 1, the processor 230 determines one or more desired output parameters, such as a command modulation index $K_{MI}$ ranging in one example from 0 to 1, as well as a command angle θ expressed in radians or degrees and representing the desired rotational angle of the rotor of the motor load 206 in one example. In other non-motor drive power conversion system applications, the command angle θ represents the desired phase angle of the inverter output waveforms generally. The processor 230 determines at 104 whether the fundamental inverter output frequency $\omega_{FUNDAMENTAL}$ is less than a non-zero threshold frequency $\omega_{TH}$. In operation of certain embodiments, the controller 220 obtains the current operating fundamental frequency by any suitable means, such as through feedback sensors, motor speed estimation techniques, etc. The threshold frequency $\omega_{TH}$ may be a preset value stored in the electronic memory 232 in certain embodiments, or may be computed by the processor 230. Moreover, the motor drive controller 230 may allow user adjustment of the threshold frequency $\omega_{TH}$ in certain embodiments. In certain embodiments, $\omega_{TH}$ corresponds to a threshold period less than or equal to the time constant $T_{IGHT\ JUNCTION\text{-}CASE\ THERMAL\ IMPEDANCE}$ of the inverter switching devices S7-S12, for example, less than or equal to twice the time constant $T_{IGHT\ JUNCTION\text{-}CASE\ THERMAL\ IMPEDANCE}$. In this manner, the threshold is set to detect low inverter output frequencies (e.g., motor speeds) at which the inverter fundamental frequency approaches a speed range at which the switching loss of the IGBT switching devices S7-S12 begin to predominate over average losses.

If the fundamental inverter output frequency $\omega_{FUNDAMENTAL}$ is greater than or equal to $\omega_{TH}$ (NO at 104), the control processor 230 in one embodiment computes a first set of initial phase duty ratios d1a(θ), d1b(θ) and d1c(θ) at 106 according to the desired output parameters $K_{MI}$ and θ, and generates the inverter switching control signals 224a at 108 for the present inverter switching cycle using SVPWM or any other suitable pulse width modulation technique according to the initial phase duty ratios d1a(θ), d1b(θ) and d1c(θ). In one possible implementation, the initial phase duty ratios for the inverter output phases a, b and c are computed according to the following formulas:

$$d1_a(\theta) = K_{MI}\cos(\theta), \quad (1)$$

$$d1_b(\theta) = K_{MI}\cos(\theta - 2\pi/3), \quad (2)$$

and $$d1_c(\theta) = K_{MI}\cos(\theta + 2\pi/3). \quad (3)$$

Figure 2:
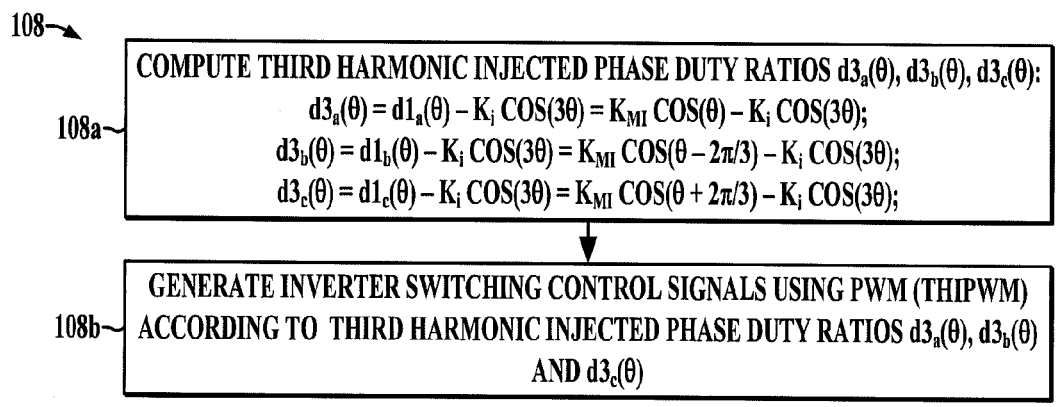
FIG. 2 is a flow diagram related to one embodiment of FIG. 1.

Referring briefly to FIG. 2, in another embodiment, operation for high speeds above the threshold $\omega_{TH}$ may be implemented using third harmonic injection pulse width modulation at 108 (THIPWM), with the control processor 230 computing third harmonic injected phase duty ratios $d3_a\theta$, $d3_b\theta$ and $d3_c\theta$ at 108a at least partially according to a third harmonic $3\omega_{FUNDAMENTAL}$ of the fundamental output frequency $\omega_{FUNDAMENTAL}$. At 108b, the inverter switching control signals 224a are then generated at 108b according to the third harmonic injected phase duty ratios $d3_a\theta$, $d3_b\theta$ and $d3_c\theta$. The third harmonic injection duty ratios $d3_a\theta$, $d3_b\theta$ and $d3_c\theta$ may be computed at 108a at least partially according to the initial phase duty ratios d1a(θ), d1b(θ) and d1c(θ) and an injection coefficient or constant $K_i$, where $K_i$ is less than 1. The third harmonic injection duty ratios may be computed, for example, by addition of a third harmonic component to each initial duty ratio, or these may be computed directly, according to the following formulas:

$$d3_a(\theta) = d1_a(\theta) - K_i\cos(3\theta) = K_{MI}\cos(\theta) - K_i\cos(3\theta), \quad (4)$$

$$d3_b(\theta) = d1_b(\theta) - K_i\cos(3\theta) = K_{MI}\cos(\theta - 2\pi/3) - K_i\cos(3\theta), \quad (5)$$

and $$d3_c(\theta) = d1_c(\theta) - K_i\cos(3\theta) = K_{MI}\cos(\theta + 2\pi/3) - K_i\cos(3\theta). \quad (6)$$

Figure 3:
FIG. 3 is a flow diagram related to another embodiment of FIG. 1.

As seen in FIG. 3, the inverter switching control signals for high frequency operation ($\omega_{FUNDAMENTAL} \geq \omega_{TH}$) are computed in another embodiment at 108c according to the initial phase duty ratios d1a(θ), d1b(θ) and d1c(θ). In these and other embodiments, high-speed operation of the inverter 208 can be accomplished using any suitable pulse width modulation techniques, including without limitation sine-triangle comparison in hardware and/or processor-executed software via the controller processor 230.

Returning to FIG. 1, if instead the fundamental inverter output frequency $\omega_{FUNDAMENTAL}$ is less than $\omega_{TH}$ (YES at 104 indicating low-speed operation or startup operation), a common mode voltage frequency $\omega_{CM}$ is determined at 110 as the product of the fundamental frequency $\omega_{FUNDAMENTAL}$ and a high-frequency constant $K_{HF}$. For high-frequency injection during low-speed operation, $K_{HF}$ is generally greater than 1 ($T_{HF} = (1/K_{HF}\ \omega_{FUNDAMENTAL}) \ll T_{IGHT\ JUNCTION\text{-}CASE\ THERMAL\ IMPEDANCE}$), and in certain embodiments $K_{HF}$ is greater than or equal to 50, or greater than or equal to 100 in other possible implementations. In this regard, the common mode period $T_{CM}$ in certain embodiments is less than or equal to 0.02 times the time constant $T_{IGBT\ JUNCTION\text{-}CASE\ THERMAL\ IMPEDANCE}$, where $T_{CM}$ is less than or equal to 0.01 times the time constant $T_{IGBT\ JUNCTION\text{-}CASE\ THERMAL\ IMPEDANCE}$ in further embodiments. This technique ensures that the component at the common mode voltage frequency $\omega_{CM}$ injected into the phase duty ratios corresponds to a period $T_{HF}$ which is less than the switching device time constant $T_{IGBT\ JUNCTION\text{-}CASE\ THERMAL\ IMPEDANCE}$, thereby mitigating excessive junction temperature situations in operation at rated output levels of the multiphase inverter 218 at startup or low speeds.

At 120 in FIG. 1, the control processor 230 implements high-frequency injection by computing a set of high frequency injected phase duty ratios $d2_a(\theta)$, $d2_b(\theta)$ and $d2_a(\theta)$ according to using the following formulas:

$$d2_a(\theta) = K_{MI}\cos(\theta) - K_i\cos(K_{HF}\theta), \quad (7)$$

$$d2_b(\theta) = K_{MI}\cos(\theta - 2\pi/3) - K_i\cos(K_{HF}\theta), \quad (8)$$

and $$d2_c(\theta) = K_{MI}\cos(\theta + 2\pi/3) - K_i\cos(K_{HF}\theta). \quad (9)$$

In this embodiment, the injection coefficient Ki is less than 1, for example ⅙ or ¼ in certain non-limiting implementations, and $K_{HF}$ is greater than one, such as 50 or more in one implementation, or 100 or more in another non-limiting embodiment.

In addition, in order to mitigate switching loss or conduction loss, DPWM is used for generation of inverter switching control signals 224a at 130 for low-frequency operation of the motor drive system 210. In this regard, the inventors have appreciated that combining the high-frequency injection via the high frequency injected phase duty ratios $d2_a(\theta)$, $d2_b(\theta)$ and $d2_c(\theta)$ with discontinuous PWM concepts advantageously facilitates operation of the inverter switches S7-S12 at low speeds and/or during high torque startup conditions while controlling the switch junction temperatures. Accordingly, this technique avoids or mitigates the need to derate a motor drive or other power conversion system 210 at low speeds.

At 132 in FIG. 1, the processor 230 determines a maximum duty ratio dmax of the high frequency injected phase duty ratios $d2_a(\theta)$, $d2_b(\theta)$ and $d2_c(\theta)$, (dmax=MAX($d2_a(\theta)$, $d2_b(\theta)$, $d2_c(\theta)$)), and also determines a minimum duty ratio dmin (dmin=MIN($d2_a(\theta)$, $d2_b(\theta)$, $d2_c(\theta)$)) for DPWM control of the inverter 218, in which one of the three phases undergoes no switching transitions in a particular switching cycle, thereby reducing switching losses in the inverter 218. A DPWM duty ratio offset "do" is determined at 134 based on the relative absolute values of dmax and dmin, with the processor 230 setting the offset value do to (1−dmax) if |dmax|>|dmin|, and otherwise setting do=(−1−dmin).

At 136, the control processor 230 computes offset phase duty ratios $d_{OFSTa}(\theta)$, $d_{OFSTb}(\theta)$ and $d_{OFSTc}(\theta)$ based on the DPWM duty ratio offset and the high frequency injected phase duty ratios $d2_a(\theta)$, $d2_b(\theta)$ and $d2_c(\theta)$ according to the following formulas:

$$d_{OFSTa}(\theta)=d2_a(\theta)+do, \quad (10)$$

$$do_{OFSTb}(\theta)=d2_b(\theta)+do, \quad (11)$$

and $$d_{OFSTc}(\theta)=d2_c(\theta)+do. \quad (12)$$

At 138 in FIG. 1, the processor 230 generates the inverter switching control signals 224*a* using DPWM using the offset phase duty ratios $d_{OFSTa}(\theta)$, $d_{OFSTb}(\theta)$ and $d_{OFSTc}(\theta)$, in one example via a triangle wave carrier having a range from −1 to +1. Thus, the offsetting via do at 134 effectively sets the highest phase modulating signal to +1 or sets the lowest phase modulating signal to −1 in a given switching cycle such that the corresponding phase switches in the inverter 218 will not switch during the given switching cycle. This, in turn, reduces the switching losses which would otherwise predominate over the average losses at low speed or during high torque startup conditions of the power conversion system 210. Thereafter, the process 100 returns to determine any new command modulation index $K_{MI}$ and angle value θ at 102 for the next inverter switching cycle.

In accordance with further aspects of the present disclosure, a non-transitory computer readable medium is provided, such as a computer memory, a memory 232 within a power converter controller 220, a CD-ROM, floppy disk, flash drive, database, server, computer, etc., which includes computer executable instructions for performing the above-described methods.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for controlling a multiphase inverter, the method comprising:
   when a fundamental output frequency of the multiphase inverter is less than a non-zero threshold frequency, using at least one electronic processor, computing a plurality of high frequency injected phase duty ratios at least partially according to at least one desired output parameter and a common mode frequency corresponding to a common mode period less than a time constant of a thermal impedance of switching devices of the multiphase inverter;
   when the fundamental output frequency of the multiphase inverter is less than the non-zero threshold frequency, using the at least one electronic processor, selectively computing a plurality of offset phase duty ratios at least partially according to the high frequency injected phase duty ratios and an offset value; and
   when the fundamental output frequency of the multiphase inverter is less than the non-zero threshold frequency, using the at least one electronic processor, generating inverter switching control signals using discontinuous pulse width modulation at least partially according to the offset phase duty ratios.

2. The method of claim 1, comprising:
   when the fundamental output frequency of the multiphase inverter is greater than or equal to the non-zero threshold frequency, using the at least one electronic processor, computing a plurality of initial phase duty ratios at least partially according to a desired output parameter; and
   when the fundamental output frequency of the multiphase inverter is greater than or equal to the non-zero threshold frequency, using the at least one electronic processor, generating the inverter switching control signals using space vector pulse width modulation at least partially according to the initial phase duty ratios.

3. The method of claim 2, wherein generating the inverter switching control signals when the fundamental output frequency of the multiphase inverter is greater than or equal to the non-zero threshold frequency comprises:
   using the at least one electronic processor, computing a plurality of third harmonic injected phase duty ratios at least partially according to a third harmonic of the fundamental output frequency of the multiphase inverter; and
   generating the inverter switching control signals using third harmonic injection pulse width modulation according to the third harmonic injected phase duty ratios.

4. The method of claim 3, wherein the non-zero threshold frequency corresponds to a threshold period less than or equal to the time constant of the thermal impedance of the switching devices of the multiphase inverter.

5. The method of claim 4, wherein the common mode period is less than or equal to 0.02 times the time constant of the thermal impedance of the switching devices of the multiphase inverter.

6. The method of claim 2, wherein the non-zero threshold frequency corresponds to a threshold period less than or equal to the time constant of the thermal impedance of the switching devices of the multiphase inverter.

7. The method of claim 2, wherein the common mode period is less than or equal to 0.02 times the time constant of the thermal impedance of the switching devices of the multiphase inverter.

8. The method of claim 1, wherein the non-zero threshold frequency corresponds to a threshold period less than or equal to the time constant of the thermal impedance of the switching devices of the multiphase inverter.

9. The method of claim 8, wherein the common mode period is less than or equal to 0.02 times the time constant of the thermal impedance of the switching devices of the multiphase inverter.

10. The method of claim 8, wherein the non-zero threshold frequency corresponds to a threshold period less than or equal to twice the time constant of the thermal impedance of the switching devices of the multiphase inverter.

11. The method of claim 10, wherein the common mode period is less than or equal to 0.02 times the time constant of the thermal impedance of the switching devices of the multiphase inverter.

12. The method of claim 1, wherein the common mode period is less than or equal to 0.02 times the time constant of the thermal impedance of the switching devices of the multiphase inverter.

13. The method of claim 12, wherein the common mode period is less than or equal to 0.01 times the time constant of the thermal impedance of the switching devices of the multiphase inverter.

14. The method of claim 1:
wherein the at least one desired output parameter includes a modulation index value $K_{MI}$, and an angle value $\theta$; and
wherein the high frequency injected phase duty ratios $d2_a(\theta)$, $d2_b(\theta)$ and $d2_c(\theta)$ for phases a, b and c of the multiphase inverter are computed according to the following equations:

$$d2_a(\theta) = K_{MI} \cos(\theta) - Ki \cos(K_{HF}\theta),$$

$$d2_b(\theta) = K_{MI} \cos(\theta - 2\pi/3) - Ki \cos(K_{HF}\theta), \text{ and}$$

$$d2_c(\theta) = K_{MI} \cos(\theta + 2\pi/3) - Ki \cos(K_{HF}\theta);$$

wherein Ki is less than 1; and
wherein $K_{HF}$ is greater than or equal to 50.

15. The method of claim 14, comprising:
when the fundamental output frequency of the multiphase inverter is greater than or equal to the non-zero threshold frequency, using the at least one electronic processor:
determining (132) a maximum duty ratio dmax of the high frequency injected phase duty ratios $d2_a(\theta)$, $d2_b(\theta)$ and $d2_c(\theta)$,
determining (132) a minimum duty ratio dmin of the high frequency injected phase duty ratios $d2_a(\theta)$, $d2_b(\theta)$ and $d2_c(\theta)$,
setting the offset value to 1−dmax if |dmax|>|dmin|,
setting the offset value to −1−dmin if |dmax|≤|dmin|, and computing the offset phase duty ratios $d_{OFSTa}(\theta)$, $d_{OFSTb}(\theta)$ and $d_{OFSTc}(\theta)$ according to the following equations:

$$d_{OFSTa}(\theta) = d2_a(\theta) + do,$$

$$d_{OFSTb}(\theta) = d2_b(\theta) + do, \text{ and}$$

$$d_{OFSTc}(\theta) = d2_c(\theta) + do;$$

wherein the inverter switching control signals are generated using discontinuous pulse width modulation at least partially according to the offset phase duty ratios $d_{OFSTa}(\theta)$, $d_{OFSTb}(\theta)$ and $d_{OFSTc}(\theta)$ using a triangle wave carrier having a range from −1 to +1.

16. The method of claim 15, wherein $K_{HF}$ is greater than or equal to 100.

17. The method of claim 14, wherein $K_{HF}$ is greater than or equal to 100.

18. A non-transitory computer readable medium with computer executable instructions for controlling a multiphase inverter, the computer readable medium comprising computer executable instructions for:
when a fundamental output frequency of the multiphase inverter is less than a non-zero threshold frequency, computing a plurality of high frequency injected phase duty ratios at least partially according to at least one desired output parameter and a common mode frequency corresponding to a common mode period less than a time constant of a thermal impedance of switching devices of the multiphase inverter;
when the fundamental output frequency of the multiphase inverter is less than the non-zero threshold frequency, selectively computing a plurality of offset phase duty ratios at least partially according to the high frequency injected phase duty ratios and an offset value; and
when the fundamental output frequency of the multiphase inverter is less than the non-zero threshold frequency, generating inverter switching control signals using discontinuous pulse width modulation at least partially according to the offset phase duty ratios.

19. An apparatus for controlling a multiphase inverter, comprising:
an electronic memory; and
at least one processor programmed to:
when a fundamental output frequency of the multiphase inverter is less than a non-zero threshold frequency, compute a plurality of high frequency injected phase duty ratios at least partially according to at least one desired output parameter and a common mode frequency corresponding to a common mode period less than a time constant of a thermal impedance of switching devices of the multiphase inverter,
when the fundamental output frequency of the multiphase inverter is less than the non-zero threshold frequency, selectively compute a plurality of offset phase duty ratios at least partially according to the high frequency injected phase duty ratios and an offset value, and
when the fundamental output frequency of the multiphase inverter is less than the non-zero threshold frequency, generate inverter switching control signals using discontinuous pulse width modulation at least partially according to the offset phase duty ratios.

20. The apparatus of claim 19, wherein the at least one processor is programmed to:
when the fundamental output frequency of the multiphase inverter is greater than or equal to the non-zero threshold frequency, compute a plurality of initial phase duty ratios at least partially according to a desired output parameter; and when the fundamental output frequency of the multiphase inverter is greater than or equal to the non-zero threshold frequency, using the at least one electronic processor, generate the inverter switching control signals using space vector pulse width modulation at least partially according to the initial phase duty ratios.

* * * * *